United States Patent
Chiang et al.

(10) Patent No.: US 8,381,153 B2
(45) Date of Patent: Feb. 19, 2013

(54) DISSECTION SPLITTING WITH OPTICAL PROXIMITY CORRECTION AND MASK RULE CHECK ENFORCEMENT

(75) Inventors: Chia-Ping Chiang, Taipei (TW); Yu-Po Tang, Taipei (TW); Ming-Hui Chih, Luzhou (TW); Cheng-Kun Tsai, Hsinchu (TW); Wei-Long Wang, Hsin-Chu (TW); Wen-Chun Huang, Xi-Gang Xiang (TW); Ru-Gun Liu, Hsinchu (TW); Tsai-Sheng Gau, Hsin-Chu (TW); Cheng-Lung Tsai, Hsin-Chu (TW); Josh J. H. Feng, Lotung (TW); Bing-Syun Yeh, Hsinchu (TW); Jeng-Shiun Ho, Hsin-Chu (TW); Cheng-Cheng Kuo, Baoshan Township, Hsinchu County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 11 days.

(21) Appl. No.: 12/884,442

(22) Filed: Sep. 17, 2010

(65) Prior Publication Data

US 2012/0072874 A1 Mar. 22, 2012

(51) Int. Cl.
*G06F 17/50* (2006.01)

(52) U.S. Cl. ........................................................ 716/110
(58) Field of Classification Search .................. 716/100, 716/110
See application file for complete search history.

(56) References Cited

U.S. PATENT DOCUMENTS

| 6,544,699 | B1 | 4/2003 | Kim et al. | |
|---|---|---|---|---|
| 7,926,002 | B2 * | 4/2011 | Word et al. | 716/50 |
| 7,954,071 | B2 * | 5/2011 | Barnes et al. | 716/53 |
| 2005/0081179 | A1 * | 4/2005 | Melvin, III | 716/20 |
| 2008/0301611 | A1 * | 12/2008 | Word et al. | 716/9 |
| 2011/0191726 | A1 * | 8/2011 | Word et al. | 716/52 |

* cited by examiner

*Primary Examiner* — Suchin Parihar
(74) *Attorney, Agent, or Firm* — Haynes and Boone, LLP (57) ABSTRACT

The present disclosure provides one embodiment of an integrated circuit (IC) design method. The method includes receiving an IC design layout having a plurality of main features; applying a main feature dissection to the main features of the IC design layout and generating sub-portions of the main features; performing an optical proximity correction (OPC) to the main features; performing a mask rule check (MRC) to a main feature of the IC design layout; and modifying one of the sub-portions of the main feature if the main feature fails the MRC.

20 Claims, 6 Drawing Sheets

DISSECTION SPLITTING WITH OPTICAL PROXIMITY CORRECTION AND MASK RULE CHECK ENFORCEMENT

BACKGROUND

The integrated circuit (IC) design is more challenging when semiconductor technologies are continually progressing to smaller feature sizes, such as 65 nanometers, 45 nanometers, and below. The performance of a chip design is seriously influenced by the control of resistance/capacitance (RC), timing, leakage, and topology of the metal/dielectric inter-layers.

To satisfy the criterion of mask-making, the enforcement of mask rule check (MRC) after optical proximity correction (OPC) is indispensable. The design pattern is adjusted to meet the specification of mask-making and the mask manufacturing capability. However, the enforcement of MRC leads to the erosion and reduction of the simulated contour hitting the target. All circuit layers in sub-45 nm generations face the dilemma between the simulated contour hitting the target and the MRC enforcement.

Therefore, what is needed is a method and a system to provide effective IC design for the advanced IC technologies addressing the above problems and reducing the patterning impact from the MRC enforcement.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Figure 1:
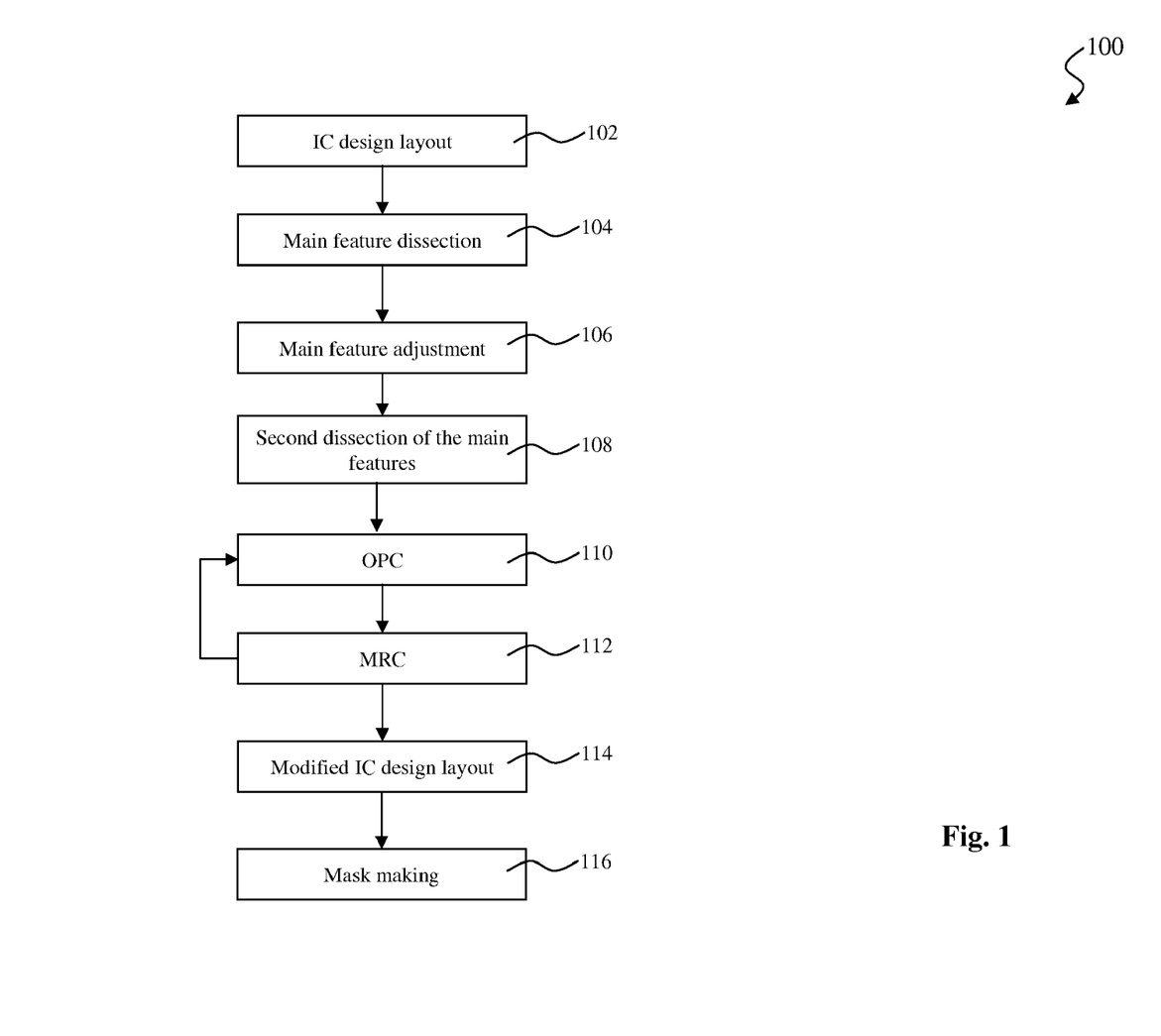
FIG. 1 is a flowchart of an embodiment of an integrated circuit (IC) design method constructed according to aspects of the present disclosure.

FIG. 1 is a flowchart of a method 100 for integrated circuit (IC) designing and mask making constructed according to various aspects of the present disclosure in one or more embodiments. The method 100 begins at step 102 by providing or receiving an IC design layout (or IC design pattern) from a designer. In one example, the designer can be a design house. In another example, the designer is a design team separated from a semiconductor manufacturer assigned for making IC products according to the IC design layout. In various embodiments, the semiconductor manufacturer is capable of making photomasks, semiconductor wafers, or both. The IC design layout includes various geometrical patterns designed for an IC product and based on the specification of the IC product.

The IC design layout is presented in one or more data files having the information of the geometrical patterns. In one example, the IC design layout is expressed in a "gds" format known in the art. The designer, based on the specification of the product to be manufactured, implements a proper design procedure to carry out the IC design layout. The design procedure may include logic design, physical design, and/or place and route. As an example, a portion of the IC design layout includes various IC features (also referred to as main features), such as active region, gate electrode, source and drain, metal lines or via of the interlayer interconnection, and openings for bonding pads, to be formed in a semiconductor substrate (such as a silicon wafer) and various material layers disposed over the semiconductor substrate. The IC design layout may include certain assist features, such as those features for imaging effect, processing enhancement, and/or mask identification information.

The method 100 may proceed to step 104 by performing a main feature dissection to the IC design layout. The IC design layout are fractured into a plurality of polygons (or trapezoids) for mask making. A polygon of the IC design layout is also referred to as a main feature. The main feature dissection includes dissecting edges of a main feature into a plurality of segments.

Figure 2:
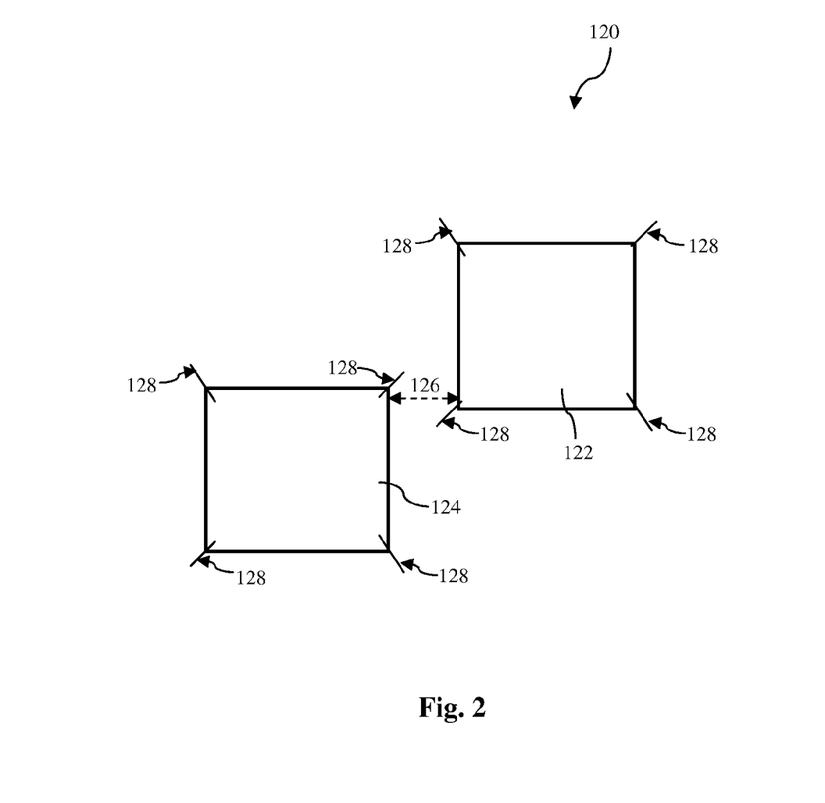
FIGS. 2-4 and 6-9 are schematic views of an IC design layout at various design stages and constructed according to aspects of the present disclosure.

FIG. 2 shows an IC design layout 120 having two exemplary main features 122 and 124 for illustration. In one embodiment, the main features 122 and 124 are patterns defining two contact/via holes to be formed on a semiconductor substrate. In another embodiment, the main features 122 and 124 include design geometries of square.

In another embodiment, the main features 122 and 124 are positioned with a certain spatial configuration. For example, the main features 122 and 124 are separated by a distance 126 as illustrated in FIG. 2.

In one embodiment, the main feature dissection is applied to the main feature 122 to generate multiple segments defined by dissection points (or stitching points) 126. A portion of the edges of main feature between two adjacent dissection points defines a segment. In the present embodiment, the four dissection points 128 are generated to the main feature 122 by the main feature dissection, defining four segments of the edges of the main feature 122. In this particular example, each segment is one side edge of the main feature 122. In another embodiment, the main feature dissection is similarly applied to the main feature 124 as illustrated in FIG. 2.

The method 100 of FIG. 1 proceeds to step 106 by performing main feature adjustment to the IC design layout 120. At the present step, the IC design layout 120 is modified/adjusted according to the manufacturing rules. In one embodiment, the IC design layout 120 is adjusted according to various design rules, referred to as design rule check (DRC). The various design rules can be extracted from the semiconductor manufacturer in consideration of the manufacturing capability. The IC design follows the design rules in order to generate producible circuit patterns.

The modification/adjustment to the IC design layout at this step is implemented to each edge segment generated by the main feature dissection at step 104. In one embodiment, each edge segment is evaluated by the design rules and is individually adjusted accordingly. In one example, the adjustment to an edge includes moving/relocating the edge segment such that the corresponding main feature is reshaped. The main feature dissection at step 104 is implemented for the main feature adjustment according by DRC at step 106, therefore, the main feature dissection at step 104 is also referred to as DRC main feature dissection.

Figure 3:
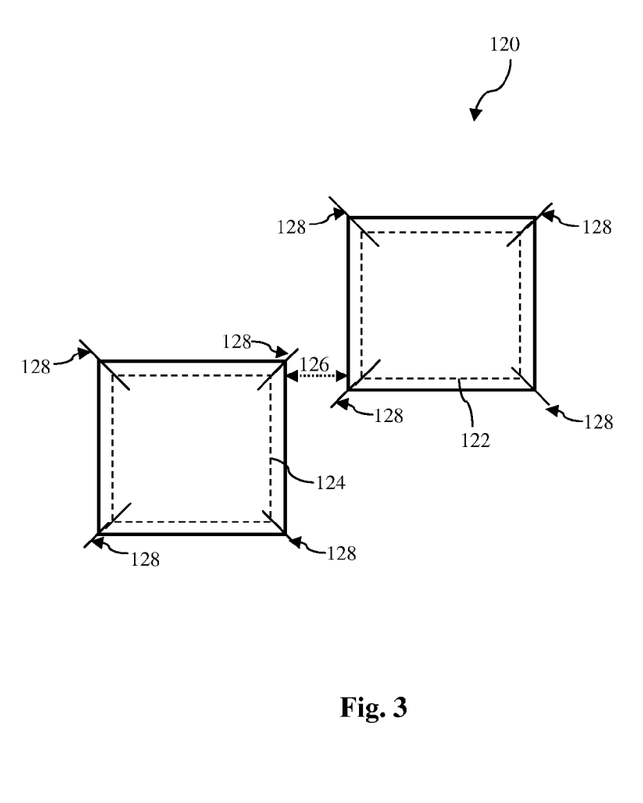

Referring to FIG. 3, the main features 122 and 124 of the IC design layout 120 are adjusted according to the design rules such that each edge segment is moved outward from its original location (shown as dashed line). In the present example, the main features 122 and 124 are enlarged.

In another example, the IC design layout 120 is adjusted through a logic operation. In the semiconductor manufacturer, various manufacturing modules convert the manufacturing constraints into a set of rules that the IC design layout 120 has to meet. Otherwise, the IC design layout 120 will be modified accordingly such that the modified IC design layout meets these rules. Such modification is implemented at this step by a logic operation.

Figure 4:
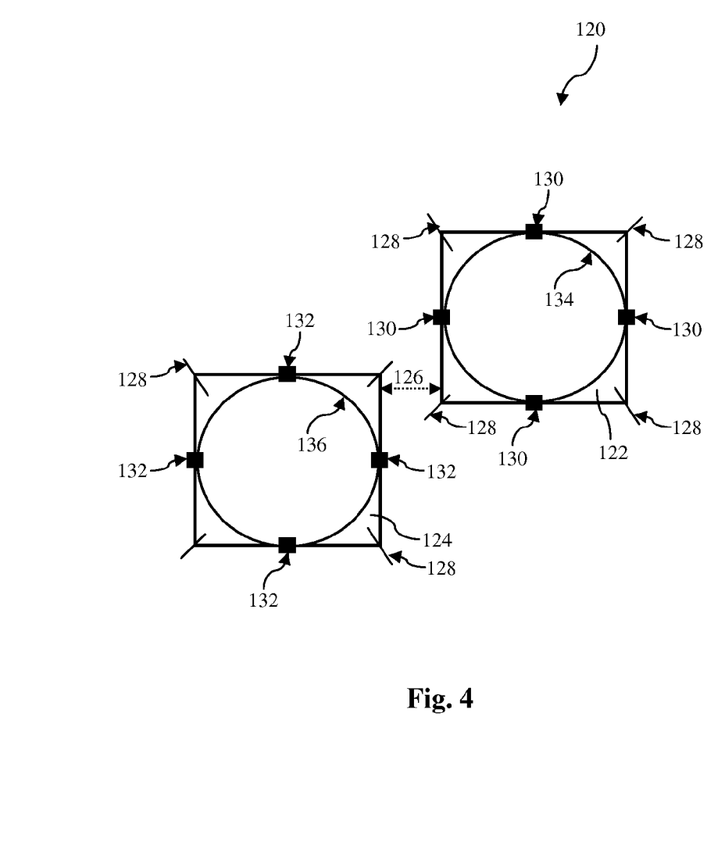

In another embodiment with reference to FIG. 4, one or more targets 130 and 132 are assigned to the main features 122 and 124, respectively, after the main feature adjustment. Various targets are assigned to the main features for simulation verification or other design purposes. The targets represent spatial locations relative to the main features. For example, the targets 130 are spatially defined in the main feature 122 of the IC design layout 120. When a simulated contour 134 of the corresponding main feature 122 is generated in a subsequent step, the defined targets 130 to the corresponding main feature 122 are checked to verify if the targets are within or overlapped with the simulated contour 134 of the corresponding main feature 122. Similarly, the targets 132 are spatially defined in the main feature 124 of the IC design layout 120. When a simulated contour 136 of the corresponding main feature 124 is generated, the targets 132 defined in the corresponding main feature 124 are checked to verify if the targets 132 are within or overlapped with the simulated contour 136 of the corresponding main feature 124. In the present example, four targets 130 are defined on the four sides of the main feature 122 and four targets 132 are defined on the four sides of the main feature 124.

The method 100 of FIG. 1 proceeds to step 108 by performing a second main feature dissection. The second main feature dissection implemented at this step is to prepare the main features of the IC design layout for subsequent mask rule check (MRC) at a later step 112. In the second main feature dissection, the main features in the IC design layout 120 are further dissected such that the corresponding edges are further segmented. The edge segments generated by the main feature dissection at step 104 are further divided into sub-segments by the second main feature dissection, also referred to as MRC main feature dissection.

Figure 5A:
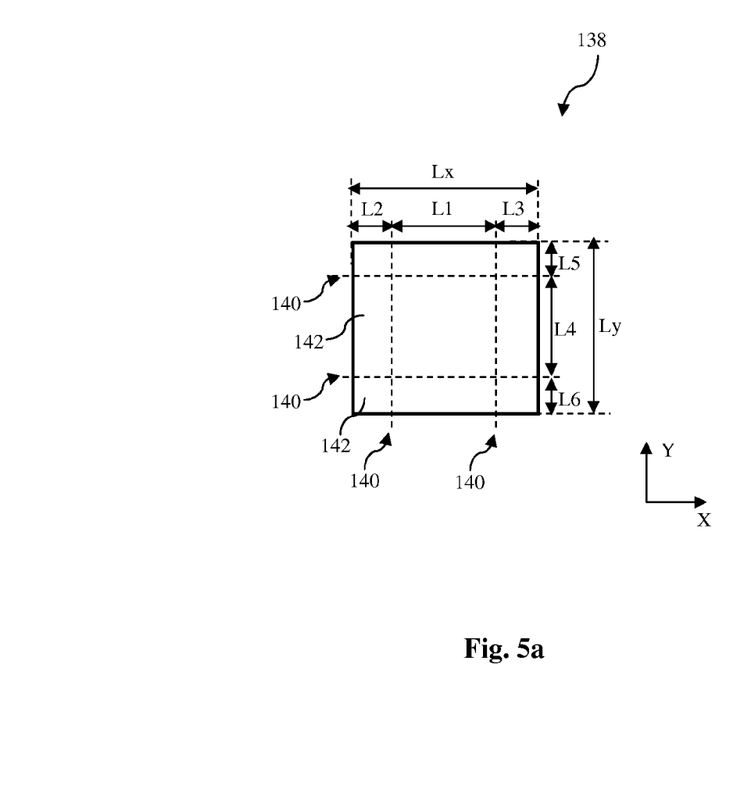
FIGS. 5*a* through 5*d* are schematic views of a main feature dissected into a plurality of sub-portions in various embodiments and constructed according to aspects of the present disclosure.

To illustrate such concept, refer to FIG. 5a, which illustrates an exemplary main feature 138 for simplicity. The second main feature dissection is further described with reference to FIG. 5a. Various dissection lines 140 in both x and y directions are defined to dissect the main feature 138 into multiple sub-portions 142. The IC design layout is defined in two dimensions. As an example, the main feature 138 is defined as a square in x and y directions. Considering the two dimensions of the main feature 138, the main feature is dissected in two dimensions, such as the x and y directions. In the present embodiment, the main feature 138 is dissected into three sections in each of the two dimensions. Thus, the main feature 138 is dissected into 9 sub-portions 142 as illustrated in FIG. 5a.

The main feature 138 spans to a first dimension Lx in the x direction and a second dimension Ly in the y direction. Take the x direction as an example, the first dimension Lx is dissected into three (first, second and third) portions by the dissection lines 140 in the y direction. The first, second and third portions have individual sub-dimensions L1, L2 and L3, respectively. For simplicity, the first, second and third portions are referred to as L1, L2 and L3, respectively. The first portion L1 is disposed between the second and third segments L2 and L3. The second sub-dimension L2 and the third sub-dimension L3 are substantially equal. In one embodiment, the ratio L1:L2 between the first sub-dimension L1 and the second sub-dimension L2 (or the third sub-dimension L3) ranges between 2:1 and 8:1. In one example, the ratio L1:L2 is about 4:1.

The second dimension Ly is dissected into three portions by the dissection lines 140 in the x direction in a way similar to the dissection applied to the first dimension Lx. For example, the second dimension Ly is dissected into three (fourth, fifth and sixth) portions. The fourth, fifth and sixth portions have individual sub-dimensions L4, L5 and L6, respectively. For simplicity, the forth, fifth and sixth portions are referred to as L4, L5 and L6, respectively. The fourth portion L4 is disposed between the fifth and sixth segments L5 and L6. The fifth sub-dimension L5 and the sixth sub-dimension L6 are substantially equal. The ratio L4:L5 between the fourth sub-dimension L4 and the fifth sub-dimension L5 (or the sixth sub-dimension L6) ranges between 2:1 and 8:1. In one example, the ratio L4:L5 is about 4:1. In another example, the sub-portion 142 in the left bottom corner of the main feature 138 is a rectangle with a dimension L2 in the x direction and a dimension L6 in the y direction. In the present embodiment, the main feature 138 is dissected into 9 portions 142 by the dissection lines 140. Each portion 142 has a dimension being one of L1, L2 and L3 in the x direction, and has another dimension being one of L4, L5 and L6 in the y direction. In another embodiment, a ratio Lx/L2 ranges between about 3 and about 10. In another embodiment, a ratio Ly/L5 ranges between about 3 and about 10.

Accordingly, the edges of the main feature 138 are further dissected into multiple segments by the dissection lines 140. In the present embodiment, each side of the main feature 138 is dissected into three segments. Considering the main feature dissection at step 104, the edges of the main feature is dissected into multiple segments, referred to as DRC segments. The second main feature dissection at step 108 further dissects each DRC segment into multiple segments, also referred to as MRC segments. One DRC segment may be dissected into more than one MRC segments by the second main feature dissection. The length of the DRC segment is referred to as L and the length of one corresponding MRC segment is referred to as S. In one embodiment, the ratio L/S ranges from 3 to 10.

The main feature 138 is a contact hole with a symmetric geometry. Alternatively, the main feature 138 may have other geometries, sizes, and may be symmetrical or asymmetrical. For example, the main feature 138 may be a straight metal line, a metal line with a corner, or other suitable shapes. The second main feature dissection applied to a main feature can thus be varied accordingly to accommodate the different shapes and geometries of the corresponding main feature.

In one embodiment, a main feature in the IC design layout 120 can be dissected differently, depending on the geometry and dimensions of the corresponding main feature. In another embodiment, a main feature may be dissected into a plurality of sub-portions with different dimensions in one direction. In another embodiment, when a main feature is asymmetric, the number of segments and the dimensions of the segments generated from the main feature by the dissection can be different between the first direction x and the second direction y.

Figure 5B:
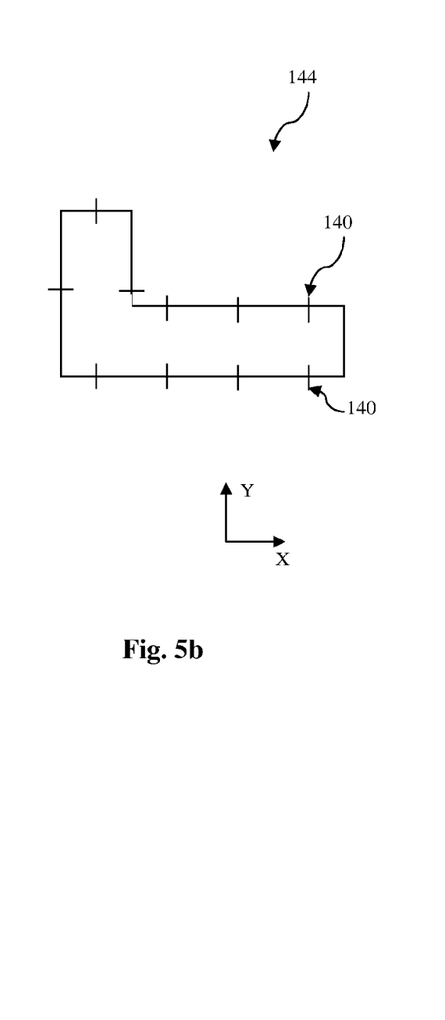
Figure 5C:
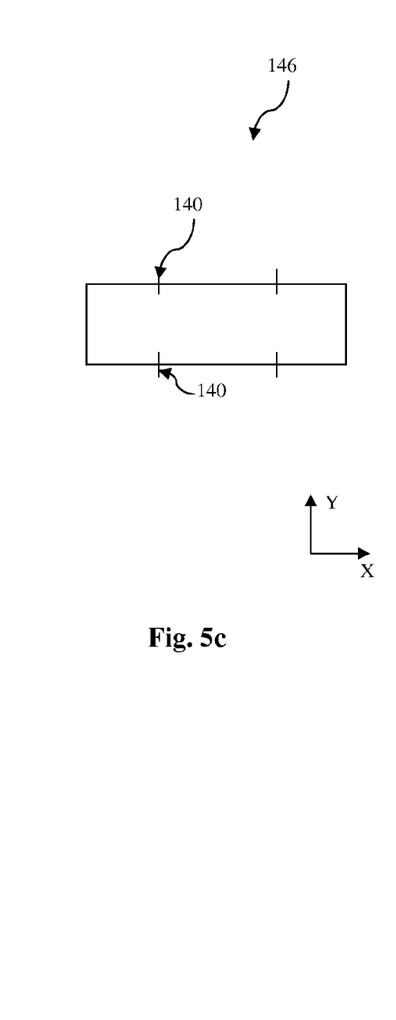
Figure 5D:
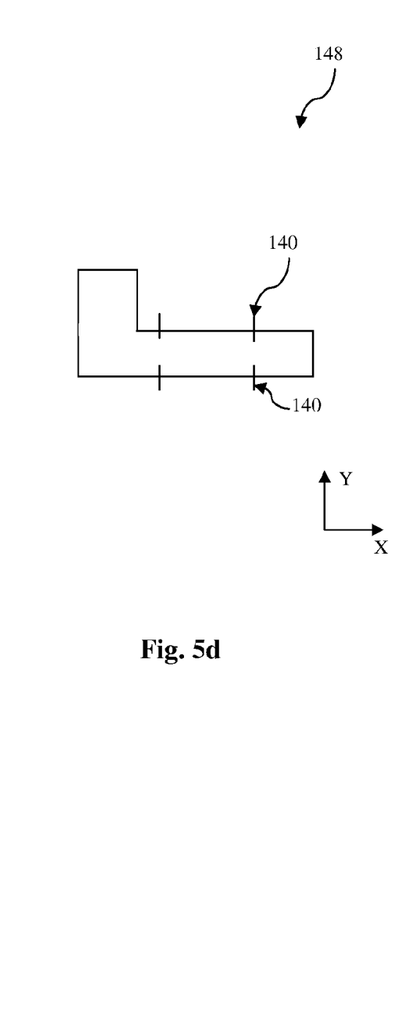

FIGS. 5b through 5d provide various embodiments for illustration. FIG. 5b includes an L-shaped main feature 144 being dissected into four portions in the x direction and into two portions in the y direction. In FIG. 5b, the dissection lines are cut down to only include portions traversing boundary of the main features 144 for simplicity. In the present embodiment, the main feature 144 is dissected into seven sub-portions. FIG. 5c includes a straight main feature 146 being dissected into three portions in the x direction. Dissection is applied to the main feature 146 in the y direction. In this case, the main feature 146 is dissected into three sub-portions. FIG. 5d includes another embodiment of an L-shaped main feature 148 being dissected into three portions in the x direction. Dissection is applied to the main feature 148 in the y direction. In this case, the main feature 148 is dissected into three sub-portions.

Figure 6:
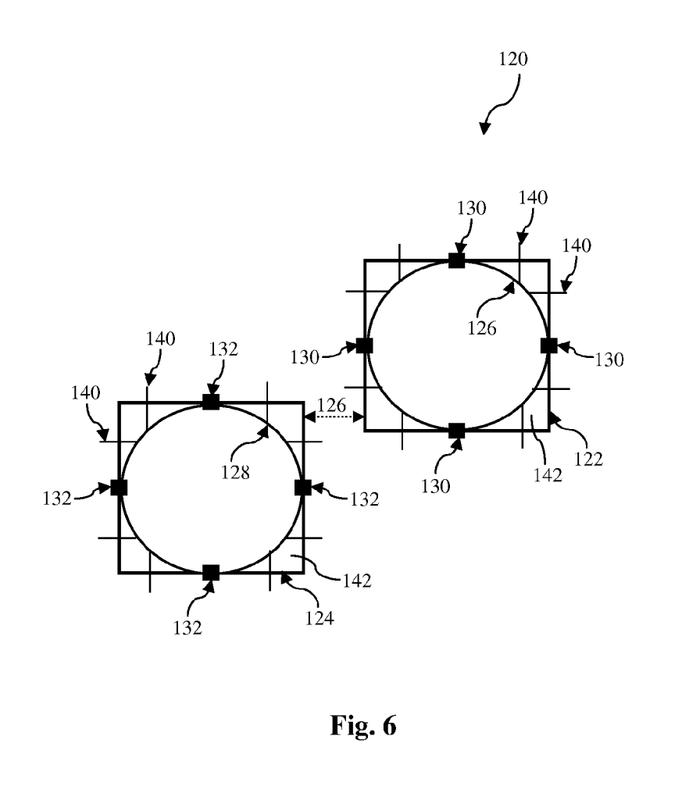

Now refer to the IC design layout 120 in FIG. 6. In one embodiment, the main feature 122 is dissected into 9 sub-portions by the dissection lines 140 substantially similar to the dissection applied to the main feature 138 of FIG. 5a. In another embodiment, the main feature 124 is dissected into 9 sub-portions by the dissection lines 140 substantially similar to the dissection applied to the main feature 138 of FIG. 5a.

The sub-portions of these main features are divided into two groups: target sub-portions and non-target sub-portions. A target sub-portion of a main feature is defined as a sub-portion with one or more targets defined within (inside or on border) the corresponding sub-portion. A non-target sub-portion of the main feature is defined as a sub-portion with no target defined within the corresponding sub-portion. Taking the main feature 122 as an example, the four targets 130 are defined in four sub-portions 142, respectively. Those four sub-portions are thus deemed target sub-portions. The remaining five sub-portions 142 of the main feature 122 are deemed non-target sub-portions. More specifically, as shown in FIG. 6, the non-target sub-portions 142 are located at four corners and the center of the main feature 122, respectively. Similarly, the main feature 124 includes four target sub-portions and five non-target sub-portions.

In an embodiment, a main feature includes a target sub-portion and a non-target sub-portion. The target sub-portion is substantially greater than the non-target sub-portion. In another embodiment, the target sub-portion includes a first dimension La in a direction. The non-target sub-portion includes a second dimension Lb in the same direction. The first dimension La and the second dimension Lb define a ratio La:Lb. In furtherance of the embodiment, the ratio La:Lb ranges between 2:1 and 8:1.

Accordingly, the MRC segments of a main feature are classified to two groups: the first group of segments associated with the non-target sub-portions are referred to as non-target segments, and the second group of segments associated with the target sub-portions are referred to as target segments.

The method 100 of FIG. 1 proceeds to step 110 by performing an optical proximity correction (OPC) to the IC design layout 120. The OPC is performed to correct the image errors by modifying the IC design layout. The OPC includes moving edges of a main feature and adding assist features to the main feature. In one embodiment, the main feature is resized, repositioned, and/or reshaped. In another embodiment, various assist features, such as scattering bars, serifs or hammerheads are added to the main feature. The assist features may be placed a distance away from the main feature (such as scattering bars) or be placed adjacent to the main feature (such as serifs and hammerheads).

Figure 7:
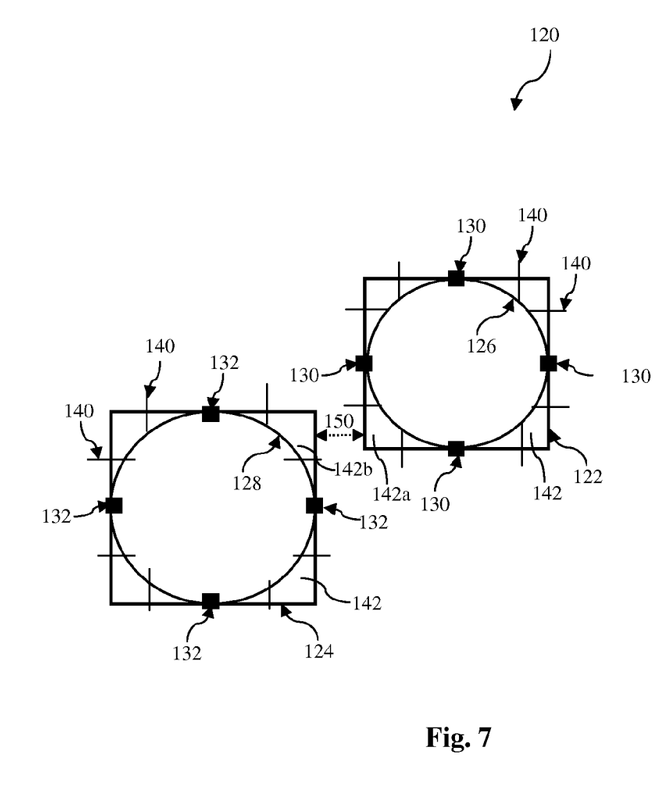

In one embodiment of the OPC implementation, both non-target and target segments of a main feature are moved outward from the main feature. In the present example, the non-target and target segments of the main features 122 and 124 are moved outward during the OPC process. Thus the distance 126 between the two adjacent main features 122 and 124 are reduced to a shorter distance 150, as illustrated in FIG. 7.

Additionally, other features may be added or other action may be applied to the IC design layout 120. For example, dummy insertion features may be added to the IC design layout 120 for enhanced chemical mechanical polishing (CMP) or other processing advantages.

The method 100 of FIG. 1 further proceeds to the step 112 by performing a mask rule check (MRC) to the IC design layout 120. At this step, the IC design layout 120 is checked by one or more mask rules and is modified accordingly. In one embodiment, various mask rules are extracted from the mask fabrication. Various mask making data are collected from the mask fabrication and extracted into a set of rules that the IC design layout, as the pattern to be imaged to a mask, should follow. In one embodiment, the MRC is implemented to the IC design layout 120 through the sub-portions of the main features. In furtherance of the present embodiment, the mask rules are applied to non-target sub-portions of the main features. Those non-target sub-portions that fail one or more mask rules are modified according to the corresponding mask rules.

Figure 8:
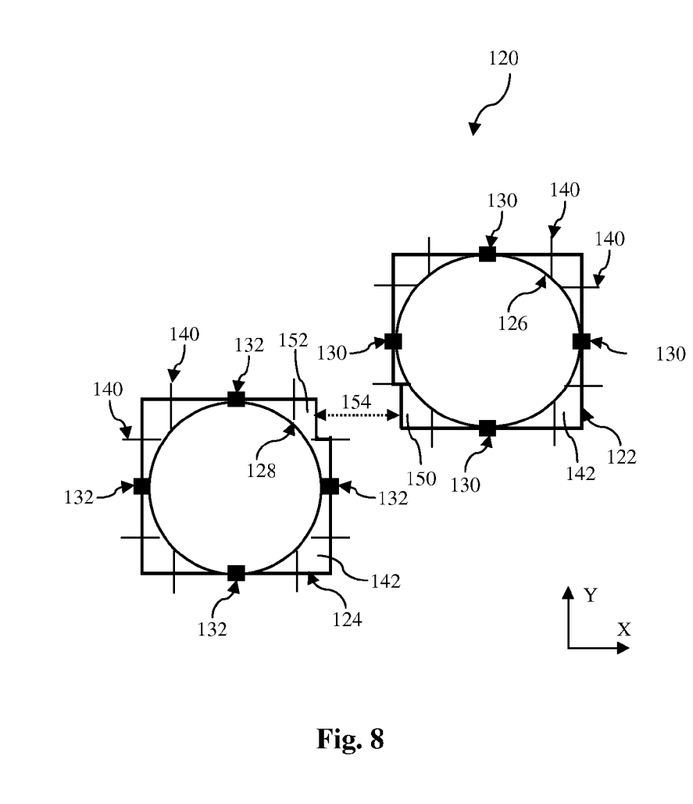

An example of the MRC is described with reference to FIGS. 7 and 8 for illustration. In a particular example, one of the mask rules is that the distance between the adjacent main features is equal to or greater than a minimum distance D. The distance 150 between the bottom-left sub-portion (labeled as 142a) of the main feature 122 and the top-right sub-portion (labeled as 142b) of the main feature 124 is illustrated in FIG. 7. If the distance 150 is less than the minimum distance D, the sub-portion 142a, 142b, or both are modified such that the violated mask rule is satisfied after the modification. The modification includes moving the relevant non-target segment(s) to increase the corresponding distance.

In this embodiment, the sub-portion 142a is modified to a new sub-portion 150 (shown in FIG. 8, also referred to as modified sub-portion), and the sub-portion 142b is modified to a new sub-portion 152. After implementing MRC at step 110, the distance 154 between the modified sub-portions 150 and 152 is equal or greater than the minimum distance D. Furthermore, the modified IC main features (122 and 124) still hit the corresponding targets after the MRC at step 112.

In the disclosed method, only non-target segments are moved/adjusted to meet one or more mask rules. The target segments remain unchanged during the MRC step 112. In one embodiment, the IC design layout 120 is checked by the mask rules in the main feature level and but is modified in the sub-portion level. In furtherance of this embodiment, a main feature is dissected into sub-portions in a way such that only non-target sub-portions need to be modified according to the mask rules. Thus, the target sub-portions are not modified and the targets associated with the main feature remain in the main feature.

In the existing method, the edges of a main feature is not segmented. For example, the whole left edge of the main feature 122 is moved toward the center of the main feature 122. In this case, the target adjacent the left edge of the main feature 122 will be out of the main feature 122, and the simulated contour 126 of the main feature 122 fails to hit the target adjacent the left edge of the main feature 122. There is confliction between the MRC and target requirements in the existing method.

The method 100 of FIG. 1 may proceed to repeat the step 110 of performing OPC and the step 112 of performing MRC to the IC design layout until the OPC and MRC are both fulfilled. In one example, both the OPC and MRC are implemented at the sub-portion level such that the iteration can effectively converge.

Figure 9:
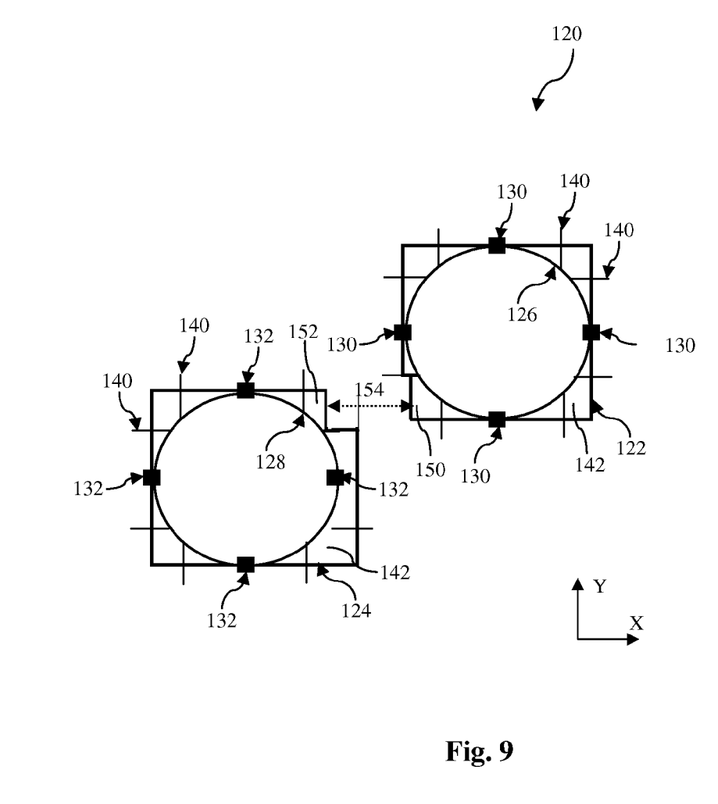

In one embodiment, the IC design layout 120 is evaluated according to the OPC criteria after the MRC at step 112. If the IC design layout 120 fails the OPC evaluation, the method 100 return to step 110 to perform another optical proximity correction. Particularly, the OPC is applied to the target sub-portions such that the modified non-target sub-portions retain the changes by the MRC. In one example with reference to FIG. 9, the main feature 124 fails the OPC evaluation. The target adjacent the modified non-target sub-portion 152 of the main feature 124 are out the simulated contour of the main feature 124. The target sub-portion associated with the corresponding target are modified according to the OPC rules, compensating the impact from the MRC adjustment such that the corresponding target is within the simulated contour of the main feature 124. In this example, the segments of the right side of the main feature 124 are moved outward from the center of the main feature 124 except for the non-target segment associated with the sub-portion 152. Thus, both MRC and the target requirements are guaranteed.

If the IC design layout 120 passes the OPC evaluation after the MRC at step 112, the method 100 may proceed to step 114 by providing a modified IC design layout 120 in a format accessible by a mask making tool, such as an e-beam mask writer. In one embodiment, the modified IC design layout 120 is expressed in a gds format. The modified IC design layout 120 includes various modifications from the OPC at the step 110 and the MRC at the step 112.

The method 100 of FIG. 1 then proceeds to step 116 for the fabrication of a mask or a group of masks based on the modified IC design layout 120. In one embodiment, an e-beam or a mechanism of multiple e-beams is used to form a pattern on a mask (photomask or reticle) based on the IC design layout. The mask can be formed in various technologies. In one embodiment, the mask is formed using the binary technology. In this case, the mask pattern includes opaque regions and transparent regions. The radiation beam (e.g. ultraviolet or UV beam), used to expose the image sensitive material layer (such as photoresist) coated on a wafer, is blocked by the opaque region and transmits through the transparent regions. In one example, the binary mask includes a transparent substrate (e.g., fused quartz), and an opaque material (e.g., chromium) coated in the opaque regions of the mask. In another embodiment, the mask is formed using a phase shift technology. In the phase shift mask (PSM), various features in the pattern formed on the mask are configured to have proper phase difference to enhance the resolution and imaging quality. In various examples, the PSM can be an attenuated PSM or an alternating PSM known in the art.

Other processing steps may follow after the formation of the mask. In this embodiment, a semiconductor wafer is fabricated using a mask or a set of masks formed by the above method. The semiconductor wafer includes a silicon substrate or other proper substrate and material layers formed thereon. Other proper substrate may alternatively be made of some suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide.

The semiconductor wafer may further include various doped regions, dielectric features, and multilevel interconnects (or are formed at subsequent manufacturing steps). In one example, the mask is used in an ion implantation process to form various doped regions in the semiconductor wafer. In another example, the mask is used in an etching process to form various etching regions in the semiconductor wafer. In another example, the mask is used in a deposition process, such as chemical vapor deposition (CVD) or physical vapor deposition (PVD), to form a thin film in various regions on the semiconductor wafer. Various manufacturing data may be collected from various manufacturing processes including CVD, PVD, etching, ion implantation and a lithography process from the previously processed semiconductor wafers, processing tools, and metrology tools.

Other embodiments and modifications may be implemented without departing from the spirit of the present disclosure. In one embodiment, when the main feature dissection is applied to a main feature at step 108 of FIG. 1 to generate target sub-portions and non-target sub-portions, various rules can be applied such that various sub-portions are effectively defined and the mask rule violations are only relevant to the non-target sub-portions.

Thus, the present disclosure provides an integrated circuit (IC) design method. The method includes receiving an IC design layout having a plurality of main features; applying a main feature dissection to the main features of the IC design layout and generating sub-portions of the main features; performing an optical proximity correction (OPC) to the main features; and performing a mask rule check (MRC) to a main feature of the IC design layout and modifying a sub-portion of the main feature if the main feature fails the MRC.

In one embodiment, the IC design method further includes fabricating a mask according to the IC design layout after the performing the MRC to the main feature. In another embodiment, the IC design method further include performing a lithography process to a semiconductor wafer using the mask. In yet another embodiment, the applying the main feature dissection to the main features of the IC design layout and the generating sub-portions of the main features further include dissecting the main feature into three segments in a first direction. In yet another embodiment, the applying the main feature dissection to the main features of the IC design layout and the generating sub-portions of the main features further includes dissecting the main feature into three segments in a second direction perpendicular to the first direction. In yet another embodiment, the performing the MRC to the main feature of the IC design layout includes modifying one of the sub-portions according to a mask rule.

In another embodiment, the IC design method further includes assigning targets to the main features of the IC design layout. The applying the main feature dissection to the main features of the IC design layout generates non-target sub-portions and target sub-portions of the main feature. In furtherance of the embodiment, the modifying a sub-portion of the main feature if the main feature fails the MRC includes only modifying the non-target sub-portions of the main feature.

The present disclosure also provides another embodiment of an integrated circuit (IC) design method. The IC design method includes receiving an IC design layout of an integrated circuit; assigning targets to a main feature of the IC design layout; performing a main feature dissection to the main feature, generating at least one non-target sub-portion and at least one target sub-portion; performing an optical proximity correction (OPC) to the IC design layout; and performing a mask rule check (MRC) to the non-target sub-portion of the main feature.

In one embodiment, the IC design method further includes fabricating a mask according to the IC design layout after the performing the MRC to the non-target sub-portion of the main feature. In another embodiment, the performing the MRC to the non-target sub-portion of the main feature includes modifying the non-target sub-portion if the non-target sub-portion fails a mask rule. In yet another embodiment, the performing the MRC to the non-target sub-portion of the main feature is under a condition that the MRC does not modify the target sub-portion of the main feature. The IC design method further includes repeating the performing an optical proximity correction (OPC) to the IC design layout; and performing a mask rule check (MRC) to the non-target sub-portion of the main feature.

The present disclosure provides yet another embodiment of an integrated circuit (IC) design method. The IC design method includes receiving an IC design layout having a plurality of main features; assigning targets to a main feature of the IC design layout; performing a main feature dissection to the main feature, generating at least one non-target sub-portion and at least one target sub-portion; performing an optical proximity correction (OPC) to the IC design layout; and modifying the non-target sub-portion of the main feature according to a mask rule when the main feature fails the mask rule.

In one embodiment, the performing the main feature dissection to the main feature includes dissecting the main feature by first lines in a first direction, the first lines dividing a first edge of the main feature into three segments; and dissecting the main feature by second lines in a second direction, the second lines dividing a second edge of the main feature into three segments and the second direction traversing the first direction. In one particular example, the main feature dissection to the main feature generates nine sub-portions of the main features by the first and second lines. In yet another embodiment, the performing the main feature dissection to the main feature generates the target sub-portion and the non-target sub-portion being substantially smaller than the target sub-portion in area. The target sub-portion includes a first dimension L1 in a direction. The non-target sub-portion includes a second dimension L2 in the direction. In yet another embodiment, a ratio L1:L2 ranges between 2:1 and 8:1.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) design method comprising:
receiving an IC design layout having a main feature;
applying a design rule check main feature dissection to the main feature of the IC design layout and generating design rule check sub-portions of the main feature;
modifying the design rule check sub-portions of the main feature of the IC design layout according to a design rule check;
assigning at least one target to the main feature, the target representing a spatial relationship relative to the main feature;
applying a mask rule check main feature dissection to the design rule check sub-portions of the main feature of the IC design layout and generating mask rule check sub-portions of the main feature;
identifying at least one of the mask rule check sub-portions as a target mask rule check sub-portion when the at least one target is on or within a border of the at least one of the mask rule check-sub portions and identifying at least another one of the mask rule check sub-portions as a non-target mask rule check sub-portion when the at least one target is not on or within a border of the at least another one of the mask rule check sub-portions;
performing an optical proximity correction (OPC) to the mask rule check sub-portions;
modifying one of the mask rule check sub-portions based on the OPC; and
performing a mask rule check (MRC) to only those mask rule check sub-portions identified as non-target mask rule check sub-portions;
modifying only those mask rule check sub-portions identified as non-target mask rule check sub-portions based on the MRC; and
after the modifying only those mask rule check sub-portions identified as non-target mask rule check sub-portions based on the MRC, providing the IC design layout in a format accessible by a mask making tool.

2. The IC design method of claim 1, further comprising fabricating a mask according to the IC design layout after the modifying only the non-target mask rule check sub-portion based on the MRC.

3. The IC design method of claim 1, wherein the applying the mask rule check main feature dissection includes dissecting one of the design rule check sub-portions of the main features into three segments in a first direction.

4. The IC design method of claim 3, wherein the applying the mask rule check main feature dissection further includes dissecting the one of the design rule check sub-portions of the main feature into three segments in a second direction approximately perpendicular to the first direction.

5. The IC design method of claim 1, further comprising applying a second optical proximity correction to the mask rule check sub-portions after the modifying only the non-target mask rule check sub-portion based on the MRC, wherein the second optical proximity correction modifies one of the target mask rule sub-portions.

6. The IC design method of claim 1, wherein there is a greater number of mask rule check sub-portions than design rule check sub-portions.

7. An integrated circuit (IC) design method comprising:
receiving an IC design layout of an integrated circuit;
assigning targets to a main feature of the IC design layout;
performing a main feature dissection to the main feature, thereby generating a non-target sub-portion and a target sub-portion, the target sub-portion having at least one target on or within a border of the target sub-portion and the non-target sub-portion not having at least one target on or within a border of the non-target sub-portion;
performing an optical proximity correction (OPC) to the IC design layout;
performing a mask rule check (MRC) to only the non-target sub-portion of the main feature;
performing another OPC to the IC design layout after the performing of the MRC to the non-target sub-portion of the main feature; and after the performing of the another OPC to the IC design layout, providing the IC design layout in a format accessible by a mask making tool.

8. The IC design method of claim 7, further comprising fabricating a mask according to the IC design layout after the performing of the another OPC to the IC design layout.

9. The IC design method of claim 7, wherein the performing the MRC includes modifying the non-target sub-portion if the non-target sub-portion fails a mask rule.

10. The IC design method of claim 7, wherein the performing the MRC is carried out under a condition that the MRC does not modify the target sub-portion of the main feature.

11. The IC design method of claim 7, further comprising repeating:
the performing the OPC to the IC design layout; and
the performing the mask rule check (MRC) to the non-target sub-portion of the main feature.

12. The IC design method of claim 7, wherein the targets represent spatial relationships relative to the main feature of the IC design layout.

13. The IC design method of claim 7, further comprising modifying only the non-target sub-portion of the main feature based on the MRC.

14. An integrated circuit (IC) design method comprising:
receiving an IC design layout having a main feature;
assigning targets to the main feature;
generating a non-target sub-portion and a target sub-portion of the main feature through a dissection process, the target sub-portion having at least one target on or within a border of the target sub-portion and the non-target sub portion not having at least one target on or within a border of the non-target sub-portion;
performing a first optical proximity correction (OPC) to the IC design layout;
modifying only the non-target sub-portion according to a mask rule;
after the modifying of the non-target sub-portion according to the mask rule, performing a second OPC to the IC design layout and modifying the target sub-portion according to the assigned targets; and
after the performing of the second OPC to the IC design layout and the modifying of the target sub-portion according to the assigned targets, providing the IC design layout in a format accessible by a mask making tool.

15. The IC design method of claim 14, further comprising making a mask according to the IC design layout after the performing of the second OPC to the IC design layout and the modifying of the target sub-portion according to the assigned targets.

16. The IC design method of claim 14, wherein the dissection process includes:
dissecting the main feature by first lines in a first direction, the first lines dividing a first edge of the main feature into three segments; and
dissecting the main feature by second lines in a second direction, the second lines dividing a second edge of the main feature into three segments, wherein the first and second directions intersect with each other.

17. The IC design method of claim 16, wherein the dissecting includes generating nine sub-portions of the main feature, each of the sub-portions being defined by one or more of the first lines and one or more of the second lines.

18. The IC design method of claim 14, wherein the non-target sub-portion generated by the dissection process is substantially smaller in area than the target sub-portion generated by the dissection process.

19. The IC design method of claim 18, wherein:
the target sub-portion includes a first dimension L1 in a direction;
the non-target sub-portion includes a second dimension L2 in the direction; and
a ratio of L1:L2 is in a range between 2:1 and 8:1.

20. The IC design method of claim 14, modifying the target and non-target sub-portions based on the first OPC.

* * * * *